(12) United States Patent
Keyes

(10) Patent No.: US 7,028,717 B1
(45) Date of Patent: Apr. 18, 2006

(54) WATER STOP FOR A LOOP INSTALLATION IN A PRE-INSULATED PIPELINE

(75) Inventor: Thomas Joseph Keyes, Fort Worth, TX (US)

(73) Assignee: Thermacor Process, LP, Fort Worth, TX (US)

( * ) Notice: Subject to any disclaimer, the term of this patent is extended or adjusted under 35 U.S.C. 154(b) by 0 days.

(21) Appl. No.: 11/090,431

(22) Filed: Mar. 25, 2005

(51) Int. Cl.
*F16L 59/14* (2006.01)

(52) U.S. Cl. .............. 138/149; 138/148; 138/113; 138/112; 285/47

(58) Field of Classification Search .............. 138/114, 138/113, 112, 148, 149; 285/47
See application file for complete search history.

(56) References Cited

U.S. PATENT DOCUMENTS

| | | | |
|---|---|---|---|
| 2,696,835 A * | 12/1954 | Kaiser | 138/101 |
| 3,068,026 A * | 12/1962 | McKamey | 285/47 |
| 3,511,282 A * | 5/1970 | Martin et al. | 138/113 |
| 3,574,357 A * | 4/1971 | Alexandru et al. | 285/47 |
| 3,654,691 A * | 4/1972 | Willhite et al. | 228/155 |
| 4,025,091 A * | 5/1977 | Zeile, Jr. | 285/53 |
| 4,130,301 A * | 12/1978 | Dunham et al. | 285/47 |
| 4,332,401 A * | 6/1982 | Stephenson et al. | 285/47 |
| 4,340,245 A * | 7/1982 | Stalder | 285/53 |
| 4,415,184 A * | 11/1983 | Stephenson et al. | 285/47 |
| 5,131,688 A * | 7/1992 | Tricini | 285/53 |
| 6,142,359 A * | 11/2000 | Corbishley et al. | 228/104 |
| 6,216,745 B1 * | 4/2001 | Augustynowicz et al. | 138/149 |

* cited by examiner

*Primary Examiner*—Patrick Brinson
(74) *Attorney, Agent, or Firm*—Charles D. Gunter, Jr.

(57) ABSTRACT

A high temperature pre-insulated piping system is shown which has a special water stop located along the length of the piping. The water stop has an internal disk which forms a pair of isolated chambers within the water stop. The internal disk is formed of a material which is impervious to the flow of water. As a result, the two internal chambers are isolated from one another and act as isolating elements to contain any breach in the exterior of the piping system to a specific location in the length of the pipe string.

5 Claims, 2 Drawing Sheets

WATER STOP FOR A LOOP INSTALLATION IN A PRE-INSULATED PIPELINE

BACKGROUND OF THE INVENTION

1. Field of the Invention

The present invention relates to pre-insulated piping systems, and more specifically to a method for isolating a section of piping in the case of a breakdown of the insulation in the presence of water or other contaminants or under thermal movement stresses.

2. Description of the Prior Art

There are many instances in which insulated pipelines are needed. For example, distributed HVAC (heating, ventilation and air conditioning) applications utilize chilled water for cooling and steam for heating. The chiller and boiler are typically contained in a central location and the chilled water and steam are distributed to other locations. For example, on a school campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Insulated pipe is conventional and commercially available. There are predominately two types of piping systems in use: Class-A drainable dryable testable (DDT); and polyurethane or polyisocyanurate "bonded" foam systems. Both of these systems use an inner carrier pipe to convey fluid. Although steel is commonly used for the inner pipe which carries the media to be piped, copper or aluminum or other metals as well as fiberglass, PVC, and similar materials may be utilized, as well. The present application is directed toward the "bonded" foam type system. These systems utilize a steel pipe to convey fluid. Around the outside of the steel pipe is a layer of insulating foam such as, for example, polyisocyanurate foam. Around the outside of the foam is a jacket of hard thermoplastic (such as high density polyethylene, HDPE). The foam has set up or cured within the outer jacket so as to bond to the jacket and to the inner pipe. The plastic jacket protects the foam from mechanical damage and also provides a water tight seal to prevent corrosion of the steel pipe. In the bonded type system, the foam and outer jacket do not move relative to the inner pipe. In the Class-A type system, on the other hand, the insulated inner pipe is designed to move independently of the associated outer jacket. In fact, there is an air gap between the inner pie and outer carrier pipe in the class-A type system.

Ground water is the enemy of foamed systems. The protective jacket of the insulated pipeline may also be punctured inadvertently by maintenance or construction operations, as where another utility line is being installed in the immediate vicinity. If the outer protective jacket is penetrated for any reason, ground water and water vapor may enter the piping system. This leads to deterioration of the foam as ground water slowly eats its away.

Steps can be taken in an attempt to prevent external intrusion into the protective jacket of the insulated pipeline. For example, in the case of adjacent utility work, above ground markers, surveying tools, and the like can be used to help avoid contact with the underground insulated pipeline.

Despite attempts to prevent damage of the above type, there continues to exist a need for a system for isolating a section of pre-insulated piping in the case of a breakdown in the integrity of the outer protective jacket.

There continues to exist a need for such a system which would absolutely insure that water which penetrated the outer jacket was prevented from traveling down the pipeline past a predetermined stop point.

SUMMARY OF THE INVENTION

The present invention has as its general purpose to provide a system for effectively isolating a section of pre-insulated piping in the case of failure of the protective outer jacket at some point along the length of the pipeline which system satisfies the previously described deficiencies.

This object is accomplished by providing an underground piping system capable of servicing temperatures in excess of 212° F. in which a metal carrier pipe is insulated by a surrounding layer of foam insulation. A first and second length of insulated and jacketed pipe are provided, each having a joining end to be joined to an end of the other length. Each of the pipe lengths comprises an inner metal pipe having an interior surface and an exterior surface. An envelope of foamed insulation is applied so that it surrounds the inner pipe exterior surface. An outer protective HDPE jacket surrounds the envelope of insulation. The joining ends of adjacent pipe lengths are affixed, as by being welded together, to form fixed joints, whereby the adjacent pipe lengths provide a continuous fluid conduit for conveying high temperature fluids.

A special water stop is installed at one or more selected points in the overall length of the piping system. Typically, the water stop would be installed at an elbow or loop location provided in the line installation. The water stop has an inner carrier pipe for joining with ends of adjacent pipe lengths in the length of piping and has an outer protective jacket with opposing outer extents which are joined to the respective protective jackets of the respective pipe lengths being coupled thereby. The water stop also has a centrally located disk which is fixedly joined to the inner carrier pipe at a selected location and which extends radially outwards generally perpendicular to the pipe in a direction toward the outer jacket. The centrally located disk is formed of a material which is impervious to the passage of water so that it forms a water stop.

In one embodiment of the invention, the centrally located inner disk is a metal disk, such as a steel disk, which is affixed to the inner carrier pipe, as by welding. Preferably, the outer protective jacket of the water stop surrounds an insulating blanket layer which, in turn, surrounds an internal metal cylinder. The internal metal cylinder is separated from the inner carrier pipe by an annular region filled with foam insulation. The centrally located disk is positioned to separate the interior of the metal cylinder into a first and second internal chambers which are isolated from one another so that intrusion of water into one of the chambers will not be communicated to the other respective chamber. Preferably, the lengths of insulated piping are part of a pipeline conveying steam, hot water or other hot fluids at a temperature of about 212° F. or above.

Additional objects, features and advantages will be apparent in the written description which follows.

DETAILED DESCRIPTION OF THE INVENTION

Figure 1:
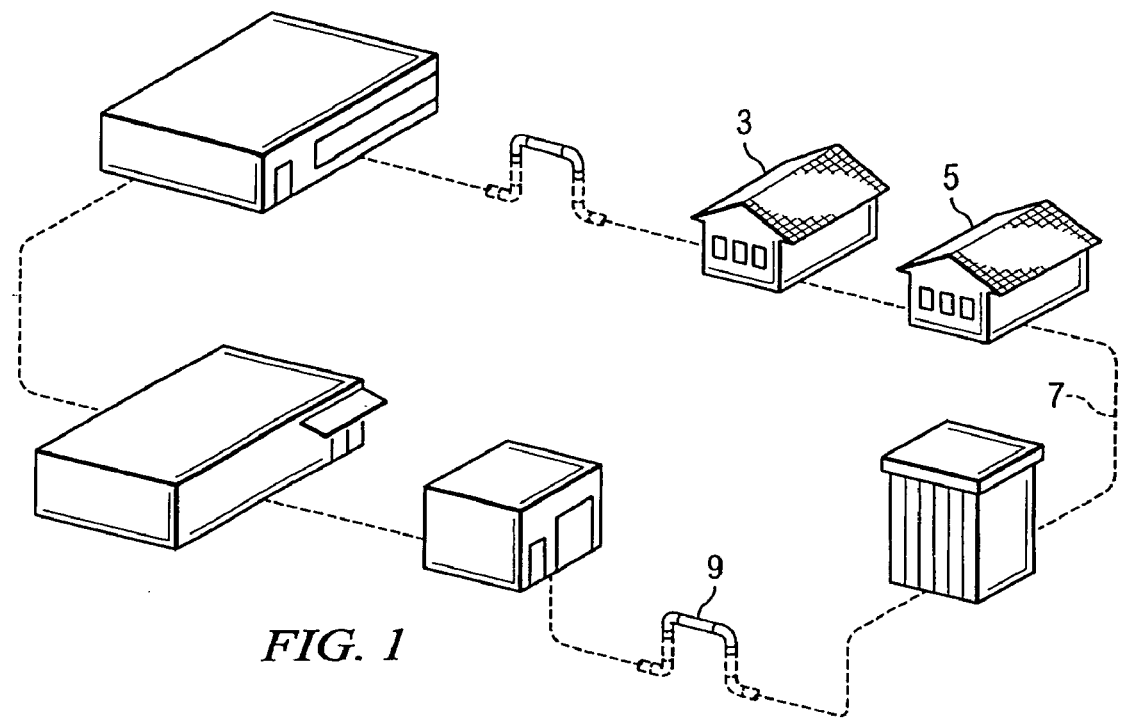
FIG. 1 is a simplified representation of a typical distributed piping system of the type under consideration utilizing hot water or steam for heating.
Figure 2:
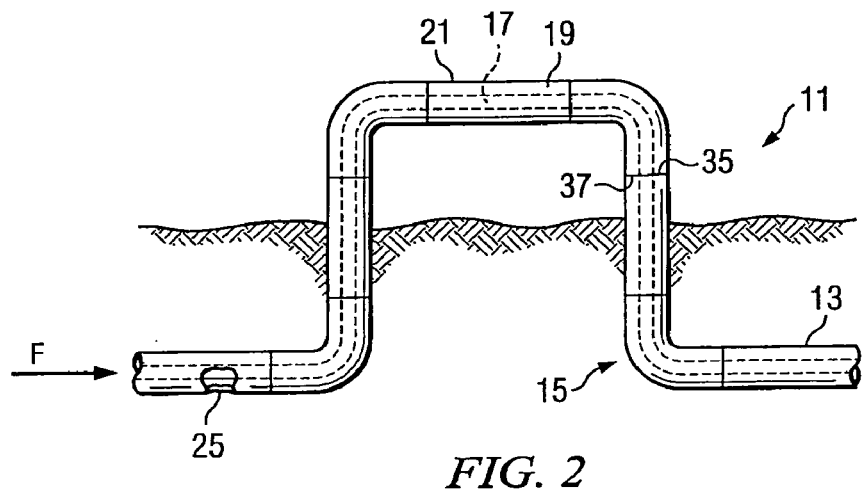
FIG. 2 is a schematic representation of an expansion loop in a pre-insulated pipeline prior to thermal expansion.

Turning first to FIGS. 1–2, there is illustrated a typical environment in which the pre-insulated piping systems of the invention might be employed. FIG. 1 shows a school campus having a number of isolated buildings 3, 5 connected by an underground insulated pipeline carrying steam which at points includes right angle loops or elbows 9.

FIG. 2 is a schematic view of the standard piping installation of the type under consideration designated generally as 11. The installation 11 includes a number of coaxially oriented lengths of pipe, such as length 13 (shown broken away in FIG. 2). The installation may also include a number of angled fittings such as the right angle elbows (generally shown as 15) in FIG. 2. Each length of pipe includes an inner pipe 17, typically formed of steel, an envelope of foamed insulation 19 surrounding the inner pipe and outer protective jacket 21 surrounding the envelope of insulation. The joining ends (shown generally as 35, 37 in FIG. 2) of adjacent pipe lengths are affixed, as by being welded together, to form fixed joints, whereby the adjacent pipe lengths provide a continuous fluid conduit for conveying high temperature fluids. The jacket 21 in FIG. 2 is typically formed of high density polyethylene (HDPE) or a similar polyolefin type material. The following references, among others, teach the manufacture of such prior art systems: U.S. Pat. No. 3,793,4111; U.S. Pat. No. 4,084,842; and U.S. Pat. No. 4,221,405, all to Stonitsch et al.; as well as U.S. Pat. No. 6,547,908 and U.S. Pat. No. 5,736,715, both assigned to Thermacor Process, Inc., the assignee of the present invention.

While the above described systems are commonly used in underground piping systems today, other systems are known which utilize simple enclosed air spaces and also other insulating materials such as mineral wool, fiber glass batting, and the like, to provide the required degree of insulation. Whatever the choice of insulating materials, various environmental factors can act to affect the integrity of such systems. For example, a manufacturing defect or an installation defect can compromise the integrity of the system. Similarly, at a later date, the outer protective jacket can be cut due to maintenance crews installing additional underground utilities. If the outer protective jacket is compromised for any reason, ground water can attack the foam and ultimately the inner steel carrier pipe. The water stop of the invention is intended to prevent or limit damage of the above type which might be caused by the penetration of the outer protective jacket of the piping system.

Figure 3:
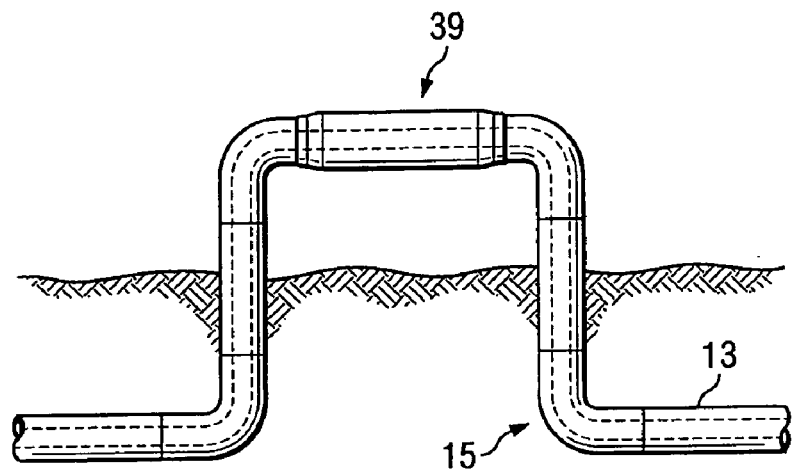
FIG. 3 is an isolated view of a loop similar to the loop of FIG. 2, but with the water stop of the invention installed.

The present invention is directed toward a method for isolating a section of piping in a piping system of the type shown in FIGS. 1–3 where a problem has occurred and the integrity of the pipe insulation has been breached at one or more locations along the overall length of the pipeline. For example, the system could be used to isolate the breach illustrated as 25 in FIG. 2 from sections of the pipeline upstream or downstream of the breached location.

The reference in this discussion to pipe "lengths" is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy conveying pipes, open or closed cell polyurethane, polyisocyanurate, polystyrene or the like, foamed rigid insulation and polypropylene, polybutylene, polyethylene, polyvinylchloride and similar protective jackets.

The term "high temperature", as used in this discussion, means that the pipelines are conveying fluids at temperatures above ambient, typically at temperatures of 212° F. and above. In some cases, temperatures of 350° F. and higher will be encountered. The expected operating temperature of the pipeline will determine the type of outer foam insulation utilized. For example, 250° F. is the present temperature limitation at which polyurethane foam is used in bonded foam systems. Temperatures above 250° F. require the use of higher temperature foams, such as polyisocyanurate foam.

The present invention is an add-on improvement to presently available pre-insulated bonded foam piping of the type which is commercially available and familiar to those in the relevant industries. Prior art pipe lengths of this general type are commercially available as standard factory type product. For example, such product is available from Thermacor Process, LP of Fort Worth, Tex., assignee of the present invention. One typical example is sold commercially as the HT-406 High Temp Steel Piping System. The published specifications for systems are as follows:

Carrier Pipe—

| | |
|---|---|
| diameter less than about 2" | A53 ERW Grade B, Std. Wt. Black Steel |
| diameter greater than about 2" | A106 SML, Std. Wt. Black Steel |

HDPE Jacket—

| | |
|---|---|
| Compatible with ASTM D3350 | |
| Specific Gravity (ASTM D792) | 0.941 min. |
| Tensile Strength (ASTM D638) | 3100 psi min. |
| Elongation Ultimate (ASTM D638) | 400% min. |
| Compressive Strength (ASTM D695) | 2700 psi min. |
| Impact Strength (ASTM D256) | 2.0 ft. lb/in. North Min. |
| Rockwell Hardness (ASTM D785) | D60 (Shore) min. |

Polyisocyanurate Insulation—

| | |
|---|---|
| Density | >2.4 lbs/ft$^3$ |
| "K" Factor | ≦0.14 @ 70° F., ≦0.24 @ 406° F. |
| Compressive Strength | >30 psi |
| Closed Cell Content | ≧90% |
| Minimum Thickness | ≧2.5" @ 366° F., ≧3.0" @ 406° F. |

The present invention preferably incorporates a water stop (39 in FIG. 3) into the insulated piping system 13 for conveying high temperature fluids, as previously discussed. The piping system shown in FIG. 3, again incorporates a first and second length of insulated and jacketed pipe, each having a joining end to be joined to and end of the other length, as discussed with respect to FIG. 2. Each pipe length comprises an inner carrier pipe having an interior surface and an exterior surface. An envelope of foamed insulation surrounds the inner pipe exterior surface. On outer protective jacket surrounds the envelope of insulations. The joining ends of adjacent pipe lengths are typically welded together to form fixed joints, whereby the adjacent pipe lengths provide a continuous length of fluid conduit for conveying high temperature fluids.

The pipeline shown in FIG. 3 is thus identical to the previously described piping system illustrated in FIGS. 1 and 2 with the exception of the water stop 39 which is inserted at a selected location within the length of the piping system, typically at an elbow or other change of direction location. In the preferred method of utilizing the water stop of the invention, the water stop 39 is inserted at a point in the overall piping system where there is likely to be no relative movement between the inner carrier pipe 17, inner insulating layer 19 and outer protective jacket 21. A preferred location for the water stop 39 of the invention is thus within an expansion loop, such as the loop shown in FIG. 3. Then, even if foam disbondment or some other failure had occurred in the pipe line upstream or downstream, the expansion loop would act to absorb such force. The water stop 39 would act to compliment these actions in isolating any water damage which might occur.

As best seen in FIG. 5, the water stop 39 has an inner carrier pipe 41 which will typically be formed of steel or other metal for joining with the ends of adjacent pipe lengths in the length of the piping string. The water stop 39 also has an outer protective jacket 43 with opposing outer extents 45, 47 which are sealingly coupled to the respected protective jackets 49, 51 of the respective pipe lengths being coupled thereby.

The water stop 39 also has a centrally located disk 53 which is fixedly joined to the inner carrier pipe 41 generally perpendicular thereto at a selected location and which extends radially outward toward the outer protective jacket 43. In the embodiment of the invention illustrated in FIG. 5, the centrally located disk 53 is a metal disk, preferably steel, which is affixed to the inner carrier pipe 41 as by water tight welds 55.

As seen in FIG. 5, the outer protective jacket 43 of the water stop 39 surrounds an insulating blanket layer 57 which may be formed of any suitable insulating material, such as fiberglass. The blanket layer 57, in turn, surrounds an internal metal cylinder 59. The internal metal cylinder 59 can be formed for example, of 10 gauge corrosion coated steel and is separated from the inner carrier pipe 41 by an annular region which is typically filled with the same type foam insulation 61 as is used in the remainder of the insulated pipeline. This will typically be either a polyurethane or polyisocyanurate foam, as previously discussed. The purpose of the cylinder 59 is to spread the heat generated by the metal disk 53 over a larger surface area so that the outer protective jacket 43 does not receive point heat loading which would tend to melt the jacket.

The centrally located disk 53 is positioned within the metal cylinder 59 to separate the interior of the metal cylinder into a first and second internal chamber 63, 65 which are isolated from one another so that intrusion of water into one of the chambers will not be communicated to the other respective chamber. While the disk 53 is shown as being formed of steel, it will be understood that other hard metals, alloys, synthetics or composites might be utilized, as well.

Figure 4:
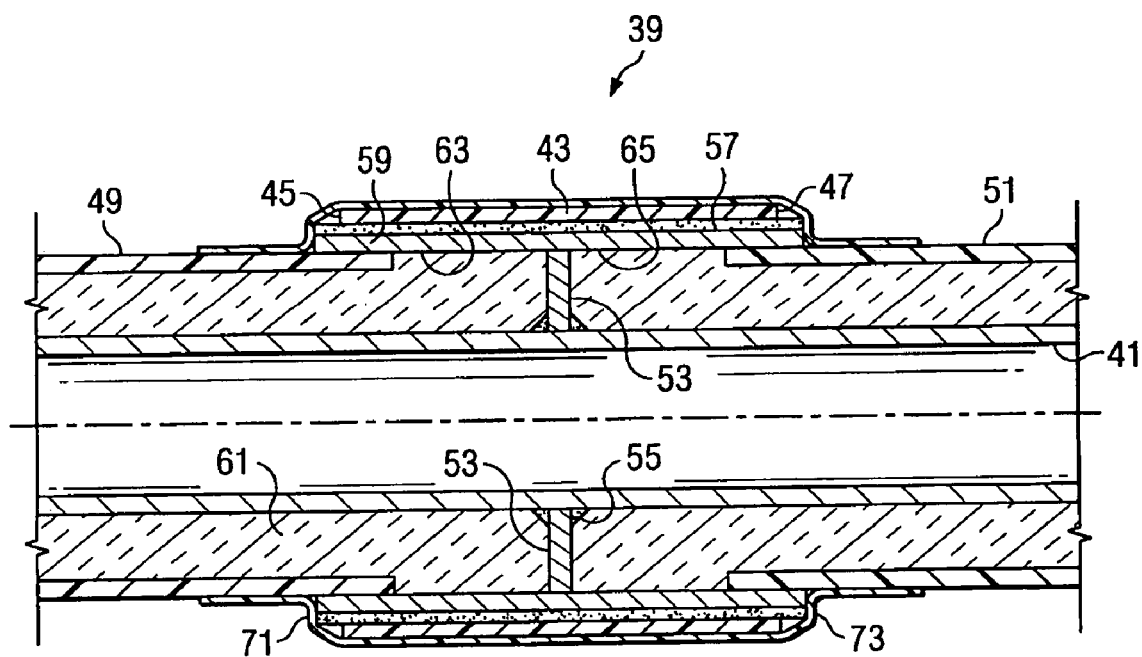
FIG. 4 is a side, cross-sectional view of the water stop of the invention.

Whatever the nature of the centrally located disk 53, the outer overlapping layers of the ultimate water stop provide a laminate type construction to dissipate heat over a fixed length or distance along the length of the pipe. The metal cylinder 59, as shown in FIG. 4, is ultimately covered by the fiberglass blanket 57 and outer layer of protective jacket 43 which is typically HDPE. The ends of the water stop are sealed by any convenient means to the remainder of the pipeline. In the example shown in FIG. 4, the ends of the water stop are sealed by means of a high temperature heat shrink material 71, 73 so that a watertight enclosure results. The heat shrink is applied between the outer protective jackets 49, 51 of the adjacent lengths of pipe and the insulating blanket 57 and metal cylinder 59. The final layer of outer protective jacket 43 can be applied in any convenient manner. For example, the jacket 43 can comprise an 16 inch commercially available UNICORE® sleeve.

An invention has been provided with several advantages. By incorporating the water stops of the invention in a pre-insulated pipeline of the type under discussion, a faulty section of the pipeline can be isolated so that water or other contaminate intrusion travels only a fixed length or distance. The system incorporates several existing, commercially available materials or components, thereby simplifying manufacture and assembly. The water stop installation can be easily applied as an additional step in the overall pipeline installation, adding little additional expense to the overall operation. The water stop is simple in design and economical to thereby implement in a variety of pre-insulated piping installations. The water stop can be conveniently installed in a location where no significant relative movement is likely to occur between the inner carrier pipe and the outer jacket, such as at a loop in the pipeline installation.

While the shown has been shown in only one of its forms, it is not thus limited but is susceptible to various change and modifications without departing from the spirit thereof.

What is claimed is:

1. An insulated piping system for conveying high temperature fluids, comprising:

a first and second length of insulated and jacketed pipe, each having a joining end to be joined to an end of the other length, each pipe length comprising an inner steel carrier pipe having an interior surface and an exterior surface, an envelope of foamed insulation surrounding the inner pipe exterior surface, and an outer protective jacket surrounding the envelope of insulation, the joining ends of adjacent pipe lengths being welded together to form fixed joints, whereby the adjacent pipe lengths provide a continuous length of fluid conduit for conveying high temperature fluids;

a special water stop comprising an outer protective jacket with opposing outer extents which are joined to the respective protective jackets of the respective pipe lengths being coupled thereby, the water stop also located at a selected location within the length of the piping system, the water stop comprising a centrally located disk which is fixedly joined to the inner carrier pipe generally perpendicular thereto at a selected location and which extends radially outward toward the outer protective jacket, the centrally located disk being formed of a material which is impervious to the passage of water;

wherein the protective jackets are formed from a synthetic polyolefin.

2. An insulated piping system for conveying high temperature fluids, comprising:

a first and second length of insulated and jacketed pipe, each having a joining end to be joined to an end of the other length, each pipe length comprising an inner steel carrier pipe having an interior surface and an exterior surface, an envelope of foamed insulation surrounding the inner pipe exterior surface, and an outer protective jacket surrounding the envelope of insulation, the joining ends of adjacent pipe lengths being welded together to form fixed joints, whereby the adjacent pipe lengths provide a continuous length of fluid conduit for conveying high temperature fluids;

a special water stop located at a selected location within the length of the piping system, the water stop comprising a centrally located disk which is fixedly joined to the inner carrier pipe generally perpendicular thereto at a selected location and which extends radially outward toward the outer protective jacket, the centrally located disk being formed of a material which is impervious to the passage of water;

wherein the outer protective jacket of the water stop surrounds an insulating blanket layer which, in turn, surrounds an internal metal cylinder, the internal metal cylinder being separated from the inner carrier pipe by an annular region filled with foam insulation.

3. A method of isolating a section of pre-insulated piping having an outer protective jacket to contain the ingress of water or other contaminants in the case of a breach in the outer jacket, the method comprising the steps of:

providing a first and second length of insulated and jacketed pipe, each having a joining end to be joined to an end of the other length, each pipe length comprising an inner metal pipe having an interior surface and an exterior surface;

applying an envelope of foamed insulation which surrounds the inner pipes exterior surface and envelopes the inner pipes;

applying an outer protective jacket which surrounds the envelope of insulation, the joining ends of adjacent pipe lengths being welded together to form fixed joints, whereby the adjacent pipe lengths provide a continuous fluid conduit for conveying high temperature fluids;

installing a special water stop comprising an outer protective jacket with opposing outer extents which are joined to the respective protective jackets of the respective pipe lengths being coupled thereby, the water stop also at a selected location within the length of the piping system, the water stop comprising a centrally located disk which is fixedly joined to the inner carrier pipe generally perpendicular thereto at a selected location and which extends radially outward toward the outer protective jacket, the centrally located disk being formed of a material which is impervious to the passage of water; and wherein the protective jackets are formed from a synthetic polyolefin.

4. The method of claim 3, wherein the outer protective jacket of the water stop surrounds an insulating blanket layer which, in turn, surrounds an internal metal cylinder, the internal metal cylinder being separated from the inner carrier pipe by an annular region filled with foam insulation.

5. The method of claim 4, wherein the centrally located disk is positioned to separate the interior of the metal cylinder into a first and second internal chambers which are isolated from one another so that intrusion of water into one of the chambers will not be communicated to the other respective chamber.

* * * * *